United States Patent [19]
Oertel et al.

[11] Patent Number: 5,918,265
[45] Date of Patent: Jun. 29, 1999

[54] DEVICE AND METHOD FOR PRODUCING A STEEP-FRONTED PRESSURE WAVE IN A LIQUID

[75] Inventors: Herbert Oertel, Ettlingen; Frank Ohle, Steinen; Joachim Maul, Weil am Rhein, all of Germany

[73] Assignee: Endress & Hauser Flowtec AG, Reinach, Switzerland

[21] Appl. No.: 09/089,986

[22] Filed: Jun. 3, 1998

Related U.S. Application Data

[60] Provisional application No. 60/053,558, Jul. 24, 1997.

[30] Foreign Application Priority Data

Jun. 4, 1997 [EP] European Pat. Off. ............ 97 81 0342

[51] Int. Cl.⁶ ...................................................... G01M 3/02
[52] U.S. Cl. .............................................. 73/37; 73/12.08
[58] Field of Search ............................... 73/53.01, 54.16, 73/49.4, 49.5, 37, 12.08

[56] References Cited

FOREIGN PATENT DOCUMENTS

| | | |
|---|---|---|
| 2 672 964 | 8/1982 | France . |
| 2 703 131 | 9/1994 | France . |
| WO 89/02071 | 3/1989 | WIPO . |

*Primary Examiner*—Hezron Williams
*Assistant Examiner*—Thuy Vinh Tran
*Attorney, Agent, or Firm*—Bose McKinney & Evans LLP

[57] ABSTRACT

This device (1) produces a steep-fronted liquid pressure wave which strikes a body (12) to be tested with an adjustable table pressure. The device has a measuring tube (10) within or to which the body (12) is fixed, and which has a pressure-proof observation window (13, 14) and a pressure-relief valve (15). A pressure tube (20) with a compression system (25) which compresses a gas is closed on one side by a first diaphragm (29) which forms part of a chamber (27) that is provided with a valve (25). The chamber is closed by a second diaphragm (19) located opposite the diaphragm (29). In tube (10), a piston (18) is movable on guides (17) up to a braking device. To carry out the method, an amount of liquid which only partially fills the tube (10) is applied to the pistons In the chamber (27), a pressure equal to half the bursting strength of the diaphragms (29, 19) is set. The pressure in the tube (20) is increased until the bursting strength is exceeded. Then the pressure in the chamber (27) is reduced to ambient pressure, thereby causing the two diaphragms (29, 29) to burst and the piston (18) with the liquid ahead of it to be accelerated toward the body (12). The piston (18) is stopped by the braking device (19), while the liquid strikes the body (12). The hydrodynamic behavior of the body is registered through the observation window (13, 14) by an optical measurement of short-time processes or by means a sensor associated therewith.

8 Claims, 1 Drawing Sheet

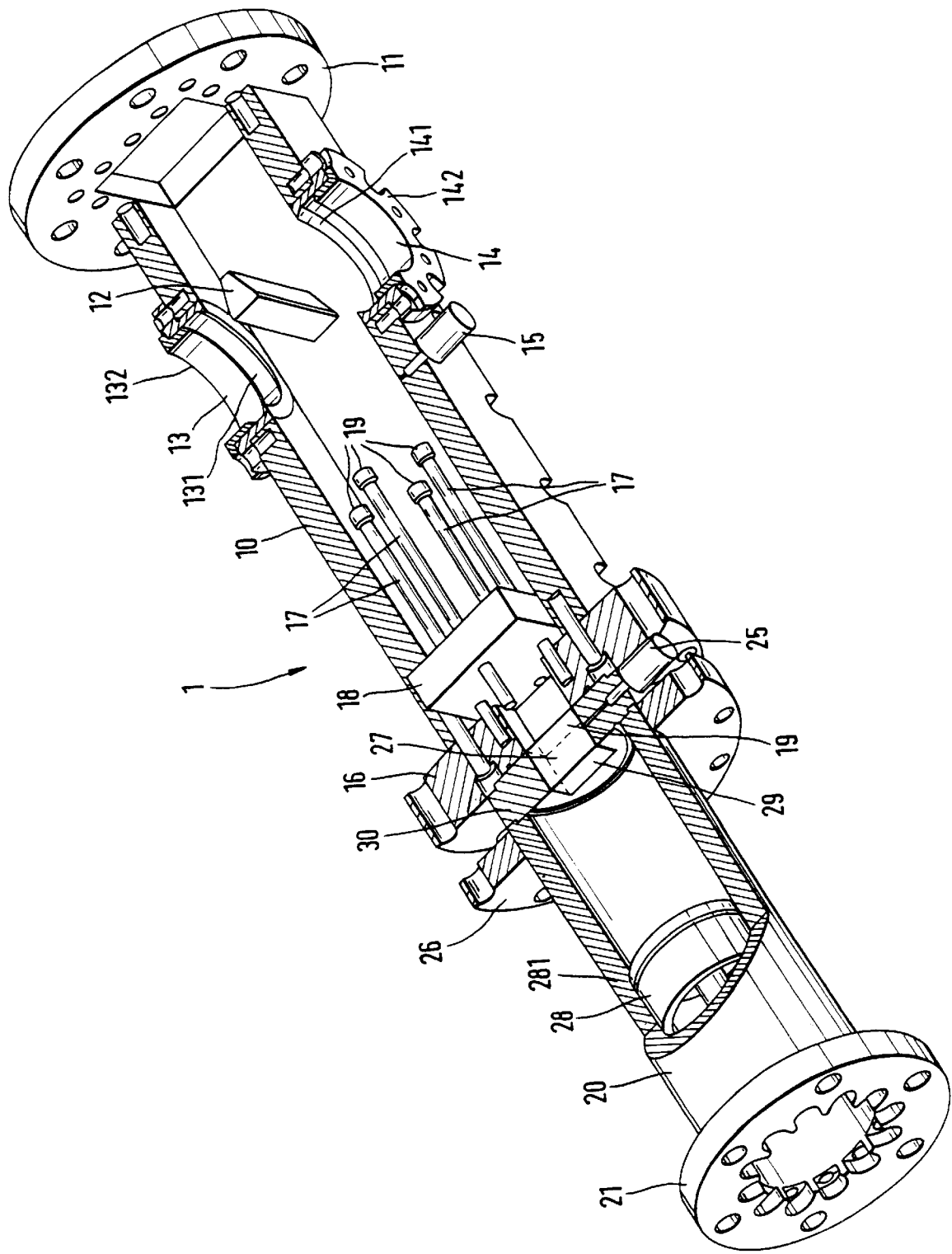

DEVICE AND METHOD FOR PRODUCING A STEEP-FRONTED PRESSURE WAVE IN A LIQUID

This application claims benefit of Provisional Application 60/053,558, filed on Jul. 24, 1977.

This invention relates to a device and a method for producing a steep-fronted pressure wave in a liquid, particularly to a device and a method for producing a pressure wave which strikes a body to be tested for its hydrodynamic behavior with an adjustable pressure greater than $10^5$ Pa (=1 bar).

With such a device, the behavior of a bluff body of a vortex flow sensor, for example, can be tested or measured with regard to the operating condition explained in the following. During the flow-rate measurement of vapors, such as water vapor, it may happen that in the pipe carrying the vapor, liquid condensates from the vapor as a result of, e.g., pressure and/or temperature variations, particularly as a result of pressure increases.

This liquid is entrained by the flowing stream of vapor and forms a steep-fronted pressure wave which strikes the bluff body with such a considerable pressure that the body itself or a sensor mounted in or on it or downstream of it may be destroyed. This impingement of a steep-fronted pressure wave is referred to in hydrodynamics as water hammer.

Since, however, water hammers are generally processes which occur only singularly and irregularly during operation of the flow sensors, while the flow sensors have to be so designed that they will not be destroyed by possible water hammers, a device and a method are needed for producing such water hammers for test purposes.

Accordingly, the invention provides a device for producing a steep-fronted pressure wave in a liquid which strikes a body to be tested for its hydrodynamic behavior with an adjustable pressure greater than $10^5$ Pa (=1 bar), said device comprising:

a measuring tube within or to which the body is fixed, which has at least one pressure-proof observation window assembly, and which has at least one pressure-relief valve;

a pressure tube;

a compression piston by means of which a gas contained in the pressure tube is compressible;

a first diaphragm, which closes the pressure tube on a side opposite the compression piston;

a chamber one side of which is formed by the first diaphragm and which has at least one valve;

a second diaphragm, which is located opposite the first diaphragm and closes the chamber, said two diaphragms having the same bursting strength;

a piston movable on guides in a chamber-side part of the measuring tube;

a braking device which prevents the piston from striking the body to be tested; and an amount of liquid which fills the measuring tube only partially and which is located on a side of the piston remote from the chamber.

The invention further provides a method for operating a device for producing a steep-fronted pressure wave in a liquid which strikes a body to be tested for its hydrodynamic behavior with an adjustable pressure greater than $10^5$ Pa (=1 bar), said apparatus comprising:

a measuring tube within or to which the body is fixed, which has at least one pressure-proof observation window assembly, and which has at least one pressure-relief valve;

a pressure tube;

a compression piston by means of which a gas contained in the pressure tube is compressible;

a first diaphragm, which closes the pressure tube on a side opposite the compression piston;

a chamber one side of which is formed by the first diaphragm and which has at least one valve;

a second diaphragm, which is located opposite the first diaphragm and closes the chamber, said two diaphragms having the same bursting strength;

a piston movable on guides in a chamber-side part of the measuring tube;

a braking device wich prevents the piston from striking the body to be tested; and an amount of liquid which fills the measuring tube only partially and which is located on a side of the piston remote from the chamber, said method comprising the steps of:

setting a pressure in the chamber via one of the valves which is approximately equal to half the bursting strength of the diaphragms;

increasing the pressure in the pressure tube by moving the compression piston until the value of the bursting strength is slightly exceeded;

reducing the pressure in the chamber to the ambient pressure via one of the valves, thereby causing the two diaphragms to burst, the piston with the liquid ahead of it being accelerated toward the body to be tested and then stopped by the braking device, while the liquid continues to move toward, and then strikes, the body to be tested; and determining and/or registering the hydrodynamic behavior of the body through the observation window assembly by optical measurement of short-time processes, or determining and/or registering the hydrodynamic behavior of the body electronically by means of a sensor associated therewith.

In a first preferred embodiment of the invention, the two diaphragms are made of pure aluminum and have a predetermined breaking point. In a second preferred embodiment. which can also be used with the first preferred embodiment, the measuring tube has a square cross section.

In a third preferred embodiment of the invention, the liquid is water. In a fourth preferred embodiment, which can also be used with the third preferred embodiment, the gas is air.

An advantage of the invention is that a measuring tool is made available with which high-energy steep-fronted pressure waves in liquids, particularly water hammers, can be produced at freely selectable times and in a reproducible manner.

The invention will now be explained in more detail with reference to the accompanying drawing, whose single figure shows an embodiment of a device in a perspective cutaway view.

In the FIGURE, a device 1 for producing a steep-fronted pressure wave in a liquid which strikes a body to be tested for its hydrodynamic behavior with an adjustable pressure greater than $10^5$ Pa (=1 bar) is shown shortened in the longitudinal direction. Device 1 has a measuring tube 10 whose cross section is preferably square and which is made of stainless material, such as stainless steel or aluminum.

One end of measuring tube 10 is provided with an end flange 11 which has a few bores. Via the latter, a flow sensor (not shown), e.g., a vortex flow sensor working on the Kármán vortex street principle, which is to be exposed to a steep-fronted liquid pressure wave to be produced with device 1, can be attached to measuring tube 10.

In the embodiment shown in the FIGURE, a body 12, here a bluff body of a vortex flow sensor, is fixed within measuring tube 10. End flange 11 is closed with a blind flange (not shown) forming a pressure-tight joint.

In the area of body 12, a first pressure-proof observation window assembly 13 and a second pressure-proof observation window assembly 14 are fitted in the wall of measuring tube 10 opposite each other. They comprise windows (not shown) of glass. The two observation window assemblies 13 and 14 further include inner frames 131 and 141, respectively, and outer frames 132 and 142, respectively. Mounted in the wall of measuring tube 10 is a pressure-relief valve 15 whose response limit is chosen to be lower than the bursting strength of the windows.

Located at the end of measuring tube 10 opposite to end flange 11 is an internal flange 16 in which cylindrical guides 17 are fixed in such a way as to project longitudinally into the lumen of measuring tube 10 and extend parallel to each other. Four guides 17 are shown in the figure, but it is also possible to provide three or more than four.

Movably disposed on guides 17 is a piston 18 which in its rest position rests against an inner side of internal flange 16. Piston 18 is also easily movable relative to the internal surface of measuring tube 10.

Guides 17 are, for example, screwed into internal flange 16, and each have at their free ends a headlike thickening, beyond which piston 18 cannot move. Together with spiral springs, which are not shown to simplify the illustration, the thickenings form a braking device which stops the motion of piston 18 toward body 12 and prevents the piston from striking the body.

Device 1 further comprises a pressure tube 20, particularly a circular cylindrical tube, with a further internal flange 26 located opposite internal flange 16. Internal flange 26 can be attached to internal flange 16 via the bores shown and an interposed spacer 30. The free end of pressure tube 20 is provided with a further end flange 21, to which a pressure generator, for example, can be screwed via the bores shown in this flange.

Movably disposed within pressure tube 20 is a compression piston 28, with which a gas contained in pressure tube 20, preferably air, is compressible. Compression piston 28 is therefore fitted with a sealing ring 281 which slides along the internal surface of pressure tube 20.

On a side opposite compression piston 28, i.e., on the outside of internal flange 26, pressure tube 20 is closed by a first diaphragm 29. Similarly, measuring tube 10 is closed on the outside of internal flange 16 by a second diaphragm 19. The latter also covers a piston-side opening of a bore of preferably square section provided in spacer 30, and diaphragm 29 covers an opening of this bore on the side of the compression piston.

Diaphragm 19 is inserted between the outside of internal flange 18 and the opposite outside of spacer 30 and is fixed in position when the two internal flanges 16, 26 are joined together, see above. Similarly, diaphragm 29 is inserted and fixed in position between the outside of internal flange 26 and the opposite, other outside of spacer 30.

As experiments have shown, the square cross section of the bore in the part 30 largely prevents any complete detachment of a part of the diaphragm from the diaphragm after the latter has bursted, since the parts of the bursted diaphragm lay themselves better on the inside wall of the square bore than on the inside wall of a circular cylindrical bore.

The two diaphragms 29, 19 and the bore in the spacer 30 form a chamber 27 with a cube-shaped volume. Chamber 27 is provided with a valve 25 by which an overpressure can be set and released.

The two diaphragms 29, 19 have the same bursting strength. To achieve this, they are preferably provided with a predetermined breaking point, which is formed by stamping, for example. As material for the diaphragms 29, 19, pure aluminum has proved suitable.

To carry out the method of the invention, device 1 is first put in its operational condition. To do this, its longitudinal axis is brought to an upright position. Furthermore, diaphragms 29, 19, prepared as described above, are fixed between measuring tube 10 and pressure tube 20 by joining together internal flanges 16, 26 via spacer 30.

The thickness of diaphragms 29, 19 is chosen in accordance with the desired pressure with which the steep-fronted liquid pressure wave is to strike the body 12 to be tested. As can be easily determined by experiments and by means of a pressure gage, the thickness of diaphragms 29, 19 is directly proportional to this pressure: The thicker the diaphragms 29, 19, the higher the pressure generated by the steep-fronted pressure wave.

The space above piston 18 is filled, e.g., through end flange 11, with a predetermined amount of liquid, particularly water, whose upper level holds a distance from the body to be tested. The liquid is thus on a side of piston 18 remote from the chamber.

The body 12 to be tested is positioned in measuring tube 10, and the above-mentioned blind flange is screwed to end flange 11 or a flow sensor is attached to end flange 11 so as to form a pressure-tight joint. Within measuring tube 10, ambient pressure now prevails. A pressure generator is attached to the other end flange 21. By increasing the pressure of the pressure generator, compression piston 28 can be moved in the direction of diaphragm 29.

A pressure approximately equal to half the bursting strength of diaphragms 29, 19 is now set in chamber 27 via valve 25. By moving compression piston 28, the pressure in pressure tube 20 is increased until the value of the bursting strength is slightly exceeded.

Then, the pressure in chamber 27, which is set at about half the bursting strength, is released via valve 25, i.e., reduced to ambient pressure. As a result, a pressure difference exists across diaphragm 29 which is greater than the bursting strength of the diaphragm, so that the latter bursts.

Since the volume between diaphragm 29 and compression piston 28 is much greater than the volume of chamber 27, e.g., 40 times greater, diaphragm 19 will subsequently burst as well, since it will be exposed to virtually the same pressure difference as diaphragm 19 and since ambient pressure prevails in measuring tube 19, as mentioned above.

The pressure now acting on piston 18 causes the latter to be accelerated toward body 12. Piston 18 is then stopped by the braking device, while the liquid continues to move toward body 12 and its front strikes the body.

Since the liquid is accelerated by piston 28 until the latter is stopped by the braking device, the front of the liquid remains virtually plane and does not burst into individual droplets.

After the bursting of diaphragm 19, piston 18 prevents the burst pressure from immediately propagating in the entire lumen of measuring tube 10 and acting on the observation windows of glass, whereby the latter would be destroyed. This pressure increases only slowly up to the value at which pressure-relief valve 15 responds, so that the pressure in measuring tube 10 is limited to this value.

The hydrodynamic behavior of a body 12 positioned in measuring tube 10 is determined and/or registered through the two observation window assemblies 13, 14 by optical measurement of short-time processes. If a flow sensor is attached to end flange 11, its hydrodynamic behavior is determined and/or registered electronically by means of an associated sensor.

An implemented device had the following dimensions. Piston 18 had an area of 80$\times$80 mm$^2$. Diaphragms 29, 19 had a bursting strength of $10^7$ Pa (=100 bars). Thus, a force of 64,000 N acted on piston 18. Piston 18 and the liquid in the measuring tube had a total weight of 1 kg. Thus, an initial acceleration of 64,000 m/s$^2$ was imparted to this mass.

On the other hand, the velocity of the amount of liquid moved by piston 18 is equal to the square root of the pressure divided on the density of the liquid. This gives a value of 100 m/s for the velocity of the liquid, which is theoretically reached after a time of about 1.5 ms and after a distance of about 0.08 m. At a burst pressure of $5 \times 10^6$ Pa (=50 bars), these 0.08 m are travelled in a time of about 2.2 ms.

To allow for frictions occurring in the device, a value of 0.4 m is chosen for the length of measuring tube 10. Guides 17 are 0.18 m long.

An optical measuring technique especially suited for measuring the short-time processes occurring upon impingement of the steep-fronted pressure wave on body 12 is differential interferometry.

In this technique, each beam of a monochromatic light source, such as an arc lamp, after passing through a front lens system and a front polarization filter disposed behind the lens system, is focused in a front Wollaston prism. The latter splits the light beam into two beams which are polarized in mutually perpendicular planes. They emerge from the prism at a fixed angle and are made parallel by means of a subsequent, front achromatic lens.

The parallel beams illuminate the object under test; in the invention, the optical components just mentioned are located in front of observation window assembly 13, for example.

After traversing the object under test, the beams pass through a rear achromatic lens and then through a rear Wollaston prism which recombines them into a single light beam. This beam passes through a rear polarization filter and then through an objective lens which projects the interfering light beams onto a camera, e.g., a camera equipped with charge-coupled devices.

In the working plane, the two beams travel over identical paths. If the paths contain an object with variable density, i.e., also an object with variable refractive indices, the beams travel over optical paths of different lengths whose difference results in a phase difference. Since the beams are superposed again, i.e., display interference, a phase difference of 0° or 360° gives an intensity maximum, while a phase difference of 180° gives extinction.

The light intensity behind the objective lens is thus a measure of the integral density gradient. In the image plane of the camera, each picture element is formed in the manner described. The measuring technique is thus a full picture differential interferometry.

The use of this technique together with the invention has the advantage that the sensitivity of the interferometric arrangement can be adapted to the object under test.

Furthermore, full picture differential interferometry is insensitive to mechanical vibrations of the object under test, since the same disturbances act on both beams. Therefore, the bursting of diaphragms 29, 19 has practically no effect on the quality of the pictures taken by the camera.

We claim:

1. A device for producing a steep-fronted pressure wave in a liquid which strikes a body to be tested for its hydro-dynamic behavior with an adjustable pressure greater than $10^5$ Pa (=1 bar), said device comprising:

a measuring tube
   within or to which the body is fixed,
   which has at least one pressure-proof observation window assembly, and
   which has at least one pressure-relief valve;

a pressure tube;

a compression piston by means of which a gas contained in the pressure tube is compressible;

a first diaphragm, which closes the pressure tube on a side opposite the compression piston;

a chamber one side of which is formed by the first diaphragm and which has at least one valve;

a second diaphragm, which is located opposite the first diaphragm and closes the chamber,
   said two diaphragms having the same bursting strength;

a piston movable on guides in a chamber-side part of the measuring tube;

a braking device which prevents the piston from striking the body to be tested; and an amount of liquid which fills the measuring tube only partially and which is located on a side of the piston remote from the chamber.

2. A device according claim 1 wherein the two diaphragms are made of pure aluminum and have a predetermined breaking point.

3. A device according to claim 1 wherein the measuring tube has a square cross section.

4. A method for operating a device for producing a steep-fronted pressure wave in a liquid which strikes a body to be tested for its hydro-dynamic behavior with an adjustable pressure greater than $10^5$ Pa (=1 bar), said apparatus comprising:

a measuring tube
   within or to which the body is fixed,
   which has at least one pressure-proof observation window assembly, and
   which has at least one pressure-relief valve;

a pressure tube;

a compression piston by means of which a gas contained in the pressure tube is compressible;

a first diaphragm, which closes the pressure tube on a side opposite the compression piston;

a chamber one side of which is formed by the first diaphragm and which has at least one valve;

a second diaphragm, which is located opposite the first diaphragm and closes the chamber,
   said two diaphragms having the same bursting strength;

a piston movable on guides in a chamber-side part of the measuring tube;

a braking device which prevents the piston from striking the body to be tested; and an amount of liquid which fills the measuring tube only partially and which is located on a side of the piston remote from the chamber, said method comprising the steps of:

setting a pressure in the chamber via one of the valves which is approximately equal to half the bursting strength of the diaphragms;

increasing the pressure in the pressure tube by moving the compression piston until the value of the bursting strength is slightly exceeded;

reducing the pressure in the chamber to the ambient pressure via one of the valves, thereby causing the two diaphragms to burst, the piston with the liquid ahead of it being accelerated toward the body to be tested and then stopped by the braking device, while the liquid continues to move toward, and then strikes, the body to be tested; and determining and/or registering the hydrodynamic behavior of the body through the observation window assembly by optical measurement of short-time processes, or determining and/or registering the hydrodynamic behavior of the body electronically by means of a sensor associated therewith.

5. A method according to claim 4 wherin the liquid is water.

6. A method according to claim 4 wherein the gas is air.

7. A device according to claim 2 wherein the measuring tube has a square cross section.

8. A method according to claim 5 wherein the gas is air.

* * * * *

UNITED STATES PATENT AND TRADEMARK OFFICE
CERTIFICATE OF CORRECTION

PATENT NO. : 5,918,265
DATED : June 29, 1999
INVENTOR(S) : Oertel et al.

It is certified that error appears in the above-identified patent and that said Letters Patent is hereby corrected as shown below:

Title page, item [73],

Under "Assignee", please correct the Assignee's name from "Endress & Hauser Flowtec AG"

to --Endress + Hauser Flowtec AG--.

Signed and Sealed this

Sixteenth Day of November, 1999

Attest:

Q. TODD DICKINSON

Attesting Officer     Acting Commissioner of Patents and Trademarks